United States Patent [19]

Warr

[11] Patent Number: 5,131,087
[45] Date of Patent: Jul. 14, 1992

[54] COMPUTER SYSTEM HAVING APPARATUS FOR AUTOMATICALLY REDISTRIBUTING DATA RECORDS STORED THEREIN

[75] Inventor: Roger F. Warr, Page, Australia

[73] Assignee: Storage Technology Corporation, Louisville, Colo.

[21] Appl. No.: 616,419

[22] Filed: Nov. 21, 1990

Related U.S. Application Data

[63] Continuation of Ser. No. 292,626, Dec. 29, 1988.

[51] Int. Cl.$^5$ .................. G06F 12/00; G06F 12/02; G06F 11/30; G06F 15/18
[52] U.S. Cl. .................................. 395/425; 395/775; 364/238.4; 364/243.1; 364/245; 364/DIG. 1; 364/245.2; 364/246; 364/926.9; 364/926.92; 364/964; 364/970; 364/970.2; 364/972.2; 364/975.5
[58] Field of Search ... 364/200 MS File, 900 MS File; 395/800

[56] References Cited

U.S. PATENT DOCUMENTS

| | | | |
|---|---|---|---|
| 4,099,235 | 7/1978 | Höschler et al. | 364/200 |
| 4,403,286 | 9/1983 | Fry et al. | 364/200 |
| 4,542,458 | 9/1985 | Kitajima et al. | 364/200 |
| 4,603,382 | 7/1986 | Cole et al. | 364/200 |
| 4,633,387 | 10/1986 | Hartung et al. | 364/200 |
| 4,636,946 | 1/1987 | Hartung et al. | 364/200 |
| 4,680,703 | 7/1987 | Kriz | 364/200 |
| 4,703,422 | 10/1987 | Kinoshita et al. | 364/200 |
| 4,727,487 | 2/1988 | Masui et al. | 364/300 |
| 4,839,798 | 6/1989 | Eguchi et al. | 364/200 |

Primary Examiner—David Y. Eng
Assistant Examiner—Caleb Pollack
Attorney, Agent, or Firm—Dorr, Carson, Sloan & Peterson

[57] ABSTRACT

The subject apparatus includes a number of data bases which are used by the expert system software to manage the computer system data storage devices. One element provided in this apparatus is a set of data storage device configuration data that provides a description of the various data storage devices and their interconnection in the computer system. A second element is a knowledge data base that includes a set of functional rules that describe the data storage device management function. These rules indicate the operational characteristics of the various data storage devices and the steps that need to be taken to provide the various improvement functions required of the computer system memory.

26 Claims, 4 Drawing Sheets

COMPUTER SYSTEM HAVING APPARATUS FOR AUTOMATICALLY REDISTRIBUTING DATA RECORDS STORED THEREIN

This is a continuation of application Ser. No. 07/292,626, filed Dec. 29, 1988.

FIELD OF THE INVENTION

This invention relates to computer memory systems and, in particular, to computer system memory performance improvement apparatus that both monitors the data retrievability efficiency of the computer system memory and modifies data set storage locations in response to memory performance conflicts detected in the computer system memory.

PROBLEM

It is a problem in data processing systems to efficiently manage the storage of data sets on the computer system memory. Many large computer systems have a hierarchy of data storage devices used therein. These data storage devices range from off line magnetic tape cartridge data storage systems to direct access storage devices which are directly connected to the computer system and available on line and, finally, cache memory which is a fast on line memory for use with data sets that are frequently read by the computer system. The difficulty with this hierarchal arrangement of data storage devices is to dynamically allocate the location of the data sets into these various data storage devices so that the frequency of data retrieval from these data sets matches the location and time wise retrieval efficiency of the data storage device. It is advantageous for computer system performance purposes to place the most frequently retrieved data sets in cache memory and the most infrequently retrieved data sets in the off line magnetic tape cartridge data storage systems.

From surveys done in the data processing field, in 1971 the median data processing system installation had 1.2 gigabytes of direct access data storage device capacity and these data storage devices had 450 data sets. In 1984, surveys revealed that the typical or median installation had 92 gigabytes of direct access data storage device capacity which devices had 44,000 data sets stored therein. There is a continuing significant growth in the capacity of direct access data storage devices in the typical computer system. However, the utilization of these direct access data storage devices has fallen from 80% in the late 1960s to approximately 55% in the present time frame. Thus, there are significant increases in the cost of direct access data storage device memory with a decreasing efficiency in the use of these direct access data storage devices in the hierarchy of data storage devices in the computer memory.

It is a commonly used metric in the computer system field that in order to manage the computer system memory, it requires approximately 1 data management employee to manage every 10 gigabytes of data in a computer system installation. This data management person performs the functions of I/O load balancing, data set placement, and cache tuning in order to provide improved efficiency in the use of the direct access data storage devices in the computer system. Any improvement in the management of the data storage devices therefore reduces the number of data management employees required to manage the computer system memory.

SOLUTION

These problems are solved and a technical advance achieved in the art by the computer system memory performance improvement apparatus. This apparatus makes use of a knowledge based (expert) system to monitor the performance of the computer system data storage devices, identify memory performance conflicts and resolve these conflicts by directing the relocation of data sets to other segments of the computer system memory.

The subject apparatus includes a number of data bases which are used by the expert system software to manage the computer system data storage devices. One element provided in this apparatus is a set of data storage device configuration data that provides a description of the various data storage devices and their interconnection in the computer system. A second element is a knowledge data base that includes a set of functional rules that describe the data storage device management function. These rules indicate the operational characteristics of the various data storage devices and the steps that need to be taken to provide the various improvement functions required of the computer system memory.

Operating on these two data bases is an expert system, which is a computer program that uses explicitly represented knowledge and computational inference techniques to achieve a level of performance compatible to that of a human expert in that application area or domain. The expert system includes an inference engine that executes the rules which comprise the basic intelligence of the expert system. The inference engine allows a virtually infinite number of rules or conditional statements to be chained together in a variety of ways. The inference engine manages the rules and the flow of data through those rules. Thus, the expert system uses the data stored in the configuration data base and the knowledge data base as well as data from monitoring of the actual performance of the data storage devices in the computer system to analyze on a dynamic basis the performance of the computer system data storage devices.

The expert system identifies memory performance conflicts such as a performance degradation of the computer system data storage devices due to a plurality of computers in the computer system attempting to access a common data storage device. The expert system identifies the performance conflict as well as the data sets stored on these data storage devices related to this conflict. Once the data sets involved in the performance conflict are identified, the expert system determines alternative memory storage locations for these data sets and activates various software routines to transport these conflict data sets to the alternative data storage locations. The relocation of these conflict data sets resolves the memory performance conflict and improves the retrievability of the data stored on these data storage devices. By performing the conflict identification and resolution on a dynamic real time basis, the data storage devices of the computer system are operated in a more efficient manner and the retrievability of the data stored on these data storage devices is significantly improved without the need for the data management personnel. The computer system memory performance improvement apparatus therefore, continuously monitors and modifies the performance of the data storage devices associated with the computer system.

DETAILED DESCRIPTION

The computer system memory performance improvement apparatus functions to monitor the performance of a computer system memory and manage this computer system memory in order to maximize performance. This function is accomplished by the use of a knowledge based (expert) system that monitors the activity of the various data storage devices in the computer system memory, identify memory performance conflicts and take steps to resolve these conflicts in order to improve the performance of the computer system memory. This apparatus includes a number of databases which are used by the expert system software to manage the data storage devices.

Data Processing System Architecture

Figure 1:
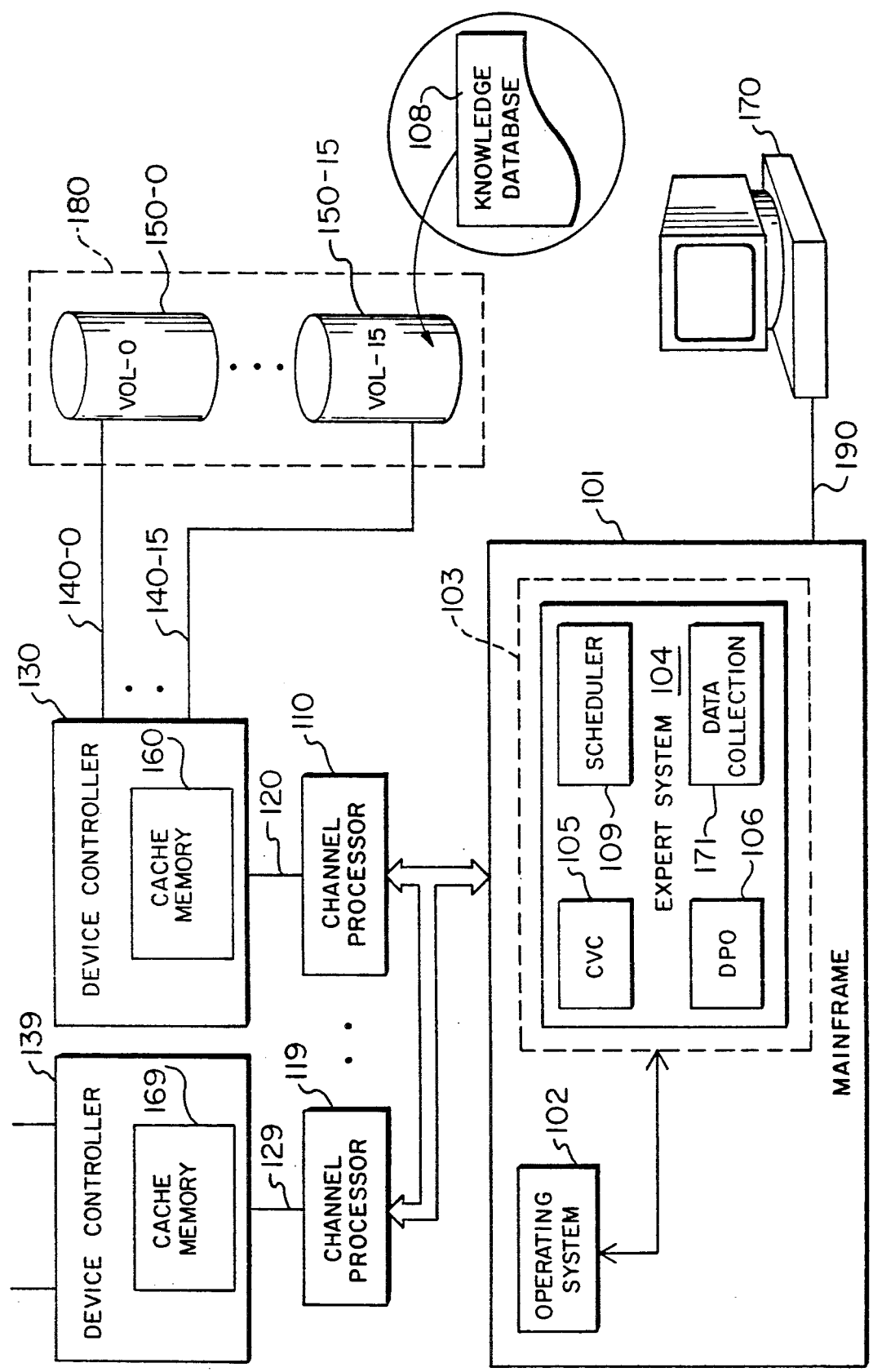
FIG. 1 illustrates, in block diagram form, the architecture of the computer system memory performance improvement apparatus.

FIG. 1 illustrates a typical data processing system in block diagram form, which system includes the computer system memory performance improvement apparatus. This computer system consists of a mainframe 101 which can be any of a number of large computer system such as an IBM 3084, an Amdahl 5860 or a NAS 9000 series computer. Each of these mainframe computers can process on the order of 100,00 instructions per second and are typically equipped with a significant amount of disk storage memory, typically on the order of 30 to 100 gigabytes of data storage capacity. For the purpose of illustration, assume that mainframe 101 is an IBM 3084 type of computer running an operating system 102 that typically is the MVS/XA operating system. These products are well known in the field and need no further explanation herein. Mainframe 101 is interconnected via a plurality of channel processors 110-119 to the data storage devices associated with mainframe 101. For the purpose of illustration, a number of disk storage devices 150-0 to 150-15 are illustrated in FIG. 1. Each of these disk drives are a commercially available device such as the 8380E disk drive system or any other ones of the multitude of similar devices. In a typical configuration, sixteen disk drives 150-0 to 150-15 are connected via associated data channels 140-0, 140-15 to a device controller 130 which is typically an 8890 type of controller. Device controller 130 functions to multiplex the data being read to and from the plurality of disk drives 150-0 to 150-15 onto a channel path 120 which interconnects device controller 130 with channel processor 110.

The computer system can be equipped with a plurality of channel processors illustrated in FIG. 1 as devices 110 to 119. Each channel processor 110 is interconnected with mainframe 101 and provides access to the disk storage devices 150-0 to 150-15 to mainframe 101. While this block diagram illustrates a general computer system configuration, it in no way should be construed as limiting the applicability of Applicants' invention. In particular, various memory configurations can be used to interconnect mainframe 101 with various data storage devices. The disk drive devices illustrated in FIG. 1 are exemplary and many computer systems rely on tape drives to implement data storage devices. Included in the computer system illustrated in FIG. 1 is a cache memory 160 which is part of device controller 130. Memory performance improvement apparatus 103 is included in mainframe 101 as is operator terminal 170 which is connected via data link 160 to mainframe 101.

Memory Configuration and Management

From a data management standpoint, the computer memory illustrated in FIG. 1 is viewed as a subsystem 180 that consists of sixteen volumes of disk storage 150-0 to 150-15. Each volume of this subsystem contains a plurality of data sets or data files. These data sets or data files are stored on a corresponding volume in an ordered fashion by dividing the volume up into sub-elements. For example, in the 8380E disk drive, each volume consists of 1770 cylinders each of which includes fifteen data tracks. Each data track can store 47K bytes of data.

In operation, mainframe 101 accesses data stored on the data volumes in subsystem 180 by transmitting a data retrieval request via the channel processor 110 associated with the data volume example 150-0 that contains the requested data. This data retrieval request is transmitted by channel processor 110 over channel path 120 to device controller 130, which in turn manages the retrieval of the data from the designated data storage device 150-0. This data retrieval is implemented by device controller 130 monitoring the rotation of disk drive 150-0 to identify the beginning of the data set stored on a track of the disk storage system. Once the disk in the disk storage system has rotated sufficiently to place the beginning of the requested data set under the read/write heads of the disk storage system, the data is transferred from disk drive 150-0 over data link 140-0 to device controller 130. Device controller 130 temporarily stores the retrieved data for transmission to mainframe 101 via channel path 120 and channel processor 110.

It is obvious from the arrangement that this is an asynchronous data transfer in that mainframe 101 transmits data retrieval requests to various device controllers where these requests are processed as the data sets become available. If too many data retrieval requests are made via one route, such as concentrating the requests on a specific volume or small subset of volumes, the performance of the computer system memory significantly degrades. It is advantageous to equalize the data retrieval requests throughout the various channel processors, channel paths and disk drives. Thus, a distribution of the data retrieval requests among the various volumes on each subsystem and across all of the subsystems significantly improves the memory performance. There are many choices available to improve memory performance such as moving data sets from one volume to another or moving a volume from one subsystem to another. It should also be noted that for purposes of this patent disclosure, the terms "string" and "subsystem" can be used interchangeably.

Another such improvement is the use of a cache memory such as cache 160 which enables the more frequently accessed volumes to load data in the cache for more rapid data retrieval times. The volumes are selected as being suitable for caching based on the data sets that are stored therein. Any input and output accesses to the data that use the cache memory benefit from the cache by speeding up the data transfer time. In order to preserve data integrity, any writes that are performed cause the data to be written directly to the disk and therefore these operations gain no benefit from a cache memory. A good volume for caching is one that has a high read rate, high activity and input/output accesses concentrated in a small number of tracks rather than scattered across the entire disk. Volumes that satisfy these conditions have a high hit ratio and therefore the input/output reads often find the desired track in cache and do not have to spend the time retrieving the data set from the disk as described above. Often, subsystems contain no volumes that are cachable or the activity of volumes that are cachable accounts for only a fraction of the total input/output activity of the subsystem.

Cache Performance Improvement

In order to gain full benefit of the cache, it is possible to reorganize the subsystem in such a way as to increase the amount of input/output accesses that go to specific cache volumes. A significant problem is to reorganize the subsystem on a data set level so as to separate the possible caching data sets from data sets that would degrade the cache performance and, in the process, create entire volumes that are suitable for storage in the cache memory. It is obvious that restructing the data set organization can entail a complete restructuring of the volumes of the subsystem which involves an enormous number of data set moves to accomplish. Instead of a complete reorganization of the subsystem, a better approach is to identify places on the subsystem which conflicts exist between possible cache data and data that is detrimental to the cache. The conflict exists where there is good cache data and bad cache data on the same volume: if the volume where cached in order to obtain the benefit of caching the good data, the bad data would cause so much interference in the cache that the overall performance would actually deteriorate. The computer system memory performance improvement apparatus locates conflicts and then moves the smallest number of data sets in order to resolve the conflict. Using this approach, a small number of moves provides a large increase in performance and better utilization of the cache memory.

In order to determine which data sets are possible candidates for caching and which data sets should not be cached, the input/output activity of the subsystem is monitored over a period of time and data is recorded on a data set basis. This stored data consists of the input/output activity (the number of input and output operation to the data set), the read percentage (percentage of operations that were reads), and the locality of reference measure, which is defined as the number of input and output to the data set divided by the number of unique tracks covered by those inputs and outputs over the period monitored. Along with these numbers, is stored the name of the data set, its size in bytes and a value called the reason code that flags data sets that are not suitable for moving. This data is used by the computer system memory performance improvement apparatus in identifying the data sets that are to be moved and the target location for these data sets.

Memory Performance Improvement Apparatus

Figure 2:
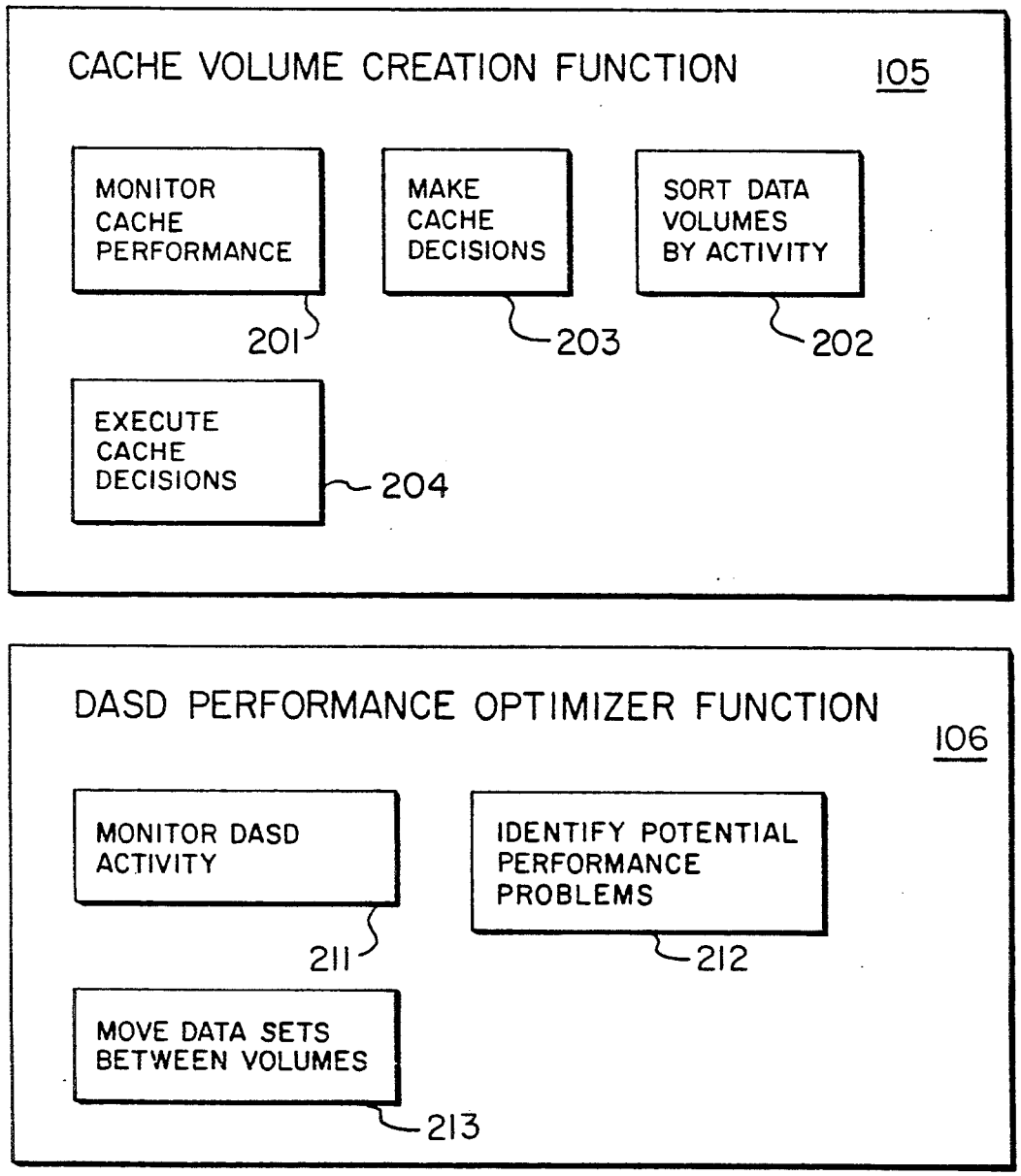
FIG. 2 illustrates in block diagram form, the architecture of the cache tuning and DASD performance optimizer elements of the computer system memory performance improvement apparatus.

The computer system memory performance improvement apparatus consists of a set of integrated data storage management functions that use knowledge or expert system techniques to monitor and automatically assist in the control of performance of the direct access data storage sub-systems. FIG. 2 illustrates the principal components of the computer system memory performance improvement apparatus 103. Memory performance improvement apparatus 103 interfaces with and runs on the MVS operating system 102 of mainframe 101. The MVS operating system 102 provides device management, file management, test management, processor management, communication management and a number of other administrative functions to the computer system memory performance improvement apparatus 103.

In order to clarify terminology, the various aspects of knowledge systems are discussed. Knowledge systems are computer based systems that emulate human reasoning by using an inference engine to interpret the encoded knowledge of human experts that is stored in a knowledge base. If the domain of the knowledge base is sufficiently narrow and a sufficiently large body of knowledge is properly coded in the knowledge base, then the knowledge system can achieve performance that matches or exceeds the ability of a human expert. In such a case, the knowledge system becomes an expert system.

One step in building an expert system is obtaining and encoding the collective knowledge of human experts into the machine readable expert system language. The specific implementation details of this encoding step is largely a function of the particular syntax of the expert system programming language selected. As an example one such expert system programming language is PROLOG which is described in the text "Programming In Prolog" by W. F. Clocksin and C. S. Mellish, Springer Verlag Inc., New York, N.Y. (1981). Basically, the expert system contains a set of rules and instructions on how the rules are to be applied to the available facts to solve a specific problem.

In the Computer System Memory Performance Improvement Apparatus 103, expert system techniques are used to monitor the performance of the computer system memory. The facts gathered through this monitoring operation are then used to identify modifications to the organization of the computer system memory as well as the data stored therein to improve the performance of the computer system memory. FIG. 2 illustrates some of the various routines or subsystems that are implemented in computer system memory performance improvement apparatus 103.

Included are cache volume creation function 105, and DASD performance optimizer function 106. Cache subsystems often end up in a state where there are no volumes on the DASD subsystem suitable for caching, or where the number of I/Os to cached volumes account for only a fraction of the total number of I/Os to the subsystem. The cache volume creation 105 creates volumes (205) on the subsystem that are suitable for caching. The cache volume creation 105 monitors (201) the performance of the cache memory 160-169 and identifies where cache candidate data sets are in conflict with data sets that are unsuitable for caching (202). Cache volume creation 105 analyzes the data set conflicts and recommends data set movements (203) that separate the good candidates from the bad candidates thereby concentrating the cache candidate data sets on a few cachable volumes. The cache volume creation 105 analyzes one DASD subsystem each time it is invoked by scheduler 109 and attempts to achieve the maximum effect with the minimum number of data set moves (204). DASD performance optimizer 106 makes data set movement recommendations to improve the performance and utilization of the DASD devices 150-0 to 150-15. DASD performance optimizer 106 operates in a proactive manner, moving data sets from over-utilized volumes and subsystems to under-utilized volumes and subsystems. DASD performance optimizer 106 monitors (211) the activity on the DASD devices 150-0 to 150-15 and identifies (212) potential DASD performance problems caused by over-and under-utilized volumes and subsystems. DASD performance optimizer 106 then relocates (213) data sets between volumes to avoid performance problems.

Scheduler 109 controls the operation of all functions and determines when activities can take place. Parameters used to establish a schedule are: installation size, peak processing times, list of functions to execute, user provided constraints. Data Collection 171 records the I/O activity of all devices on a prescheduled basis (e.g. hourly totals). In addition, detailed volume activity data and track data can be recorded. Data collection 171 creates the statistical information required by the remaining modules of the system. Database 108 contains the system configuration information as well as the statistical activity data. Those skilled in this art will appreciate that in the use of the term "database", it is contemplated that both "knowledge" and "configuration" are contained in the general data repository. Database 108 is illustrated as being stored on disk drive 150-15, although it could also be stored in computer memory performance improvement apparatus 103 on mainframe computer 101.

Cache Volume Creation

The Cache Volume Creation (CVC) module 105 is one of the performance tuning routines of the computer system memory performance improvement apparatus 103. The cache volume creation module 105 uses Expert System techniques to analyze cache subsystems and make recommendations that improve input/output I/O performance in the computer system memory.

Because of the difficulty involved with using cache properly, or because of a lack of data management employees to do the job, cache subsystems often end up in a state where there are no volumes on the subsystem suitable for caching, or where the number of I/Os to cached volumes account for only a fraction of the total number of I/Os to the subsystem. The purpose of the cache volume creation module is to remedy this situation by attempting to create volumes on the subsystem which are suitable for caching.

There may very well be data sets on the subsystem which would benefit from cache, but because the cache operates on a volume basis and the data sets reside on volumes which would be detrimental to I/O performance if cached, these data sets can't be cached. The job of the cache volume creation module is to identify where cache candidates are in conflict with data sets that are unsuitable for caching and recommend movements that separate the good candidates from the bad candidates, thereby concentrating the cache candidate data sets on a few cachable volumes. The cache volume creation module tries to achieve the maximum performance improvement with the minimum number of moves.

Cache Volume Creation Overview

The way that the cache volume creation module 302 operates is to first identify which data sets on the subsystem need to be cached. Those data sets that are good cache candidates are classified as good, and those which are bad cache candidates are classified as bad. Based on the classification of the data sets, the cache volume creation module 302 then determines which volumes are good cache volumes, which are bad, and which have good data sets in conflict with bad data sets. The volumes are classified as good, bad, and conflict respectively. The number of cache volumes required is then determined as are the data set moves needed to create this number of cache volumes. Then the conflict volumes are processed and the good data sets are separated from the bad data sets. Finally, the cache volume creation module 302 executes a last pass which checks if it can make significant improvements to cache candidate volumes with one or two moves.

Cache Volume Creation Module

Figure 3:
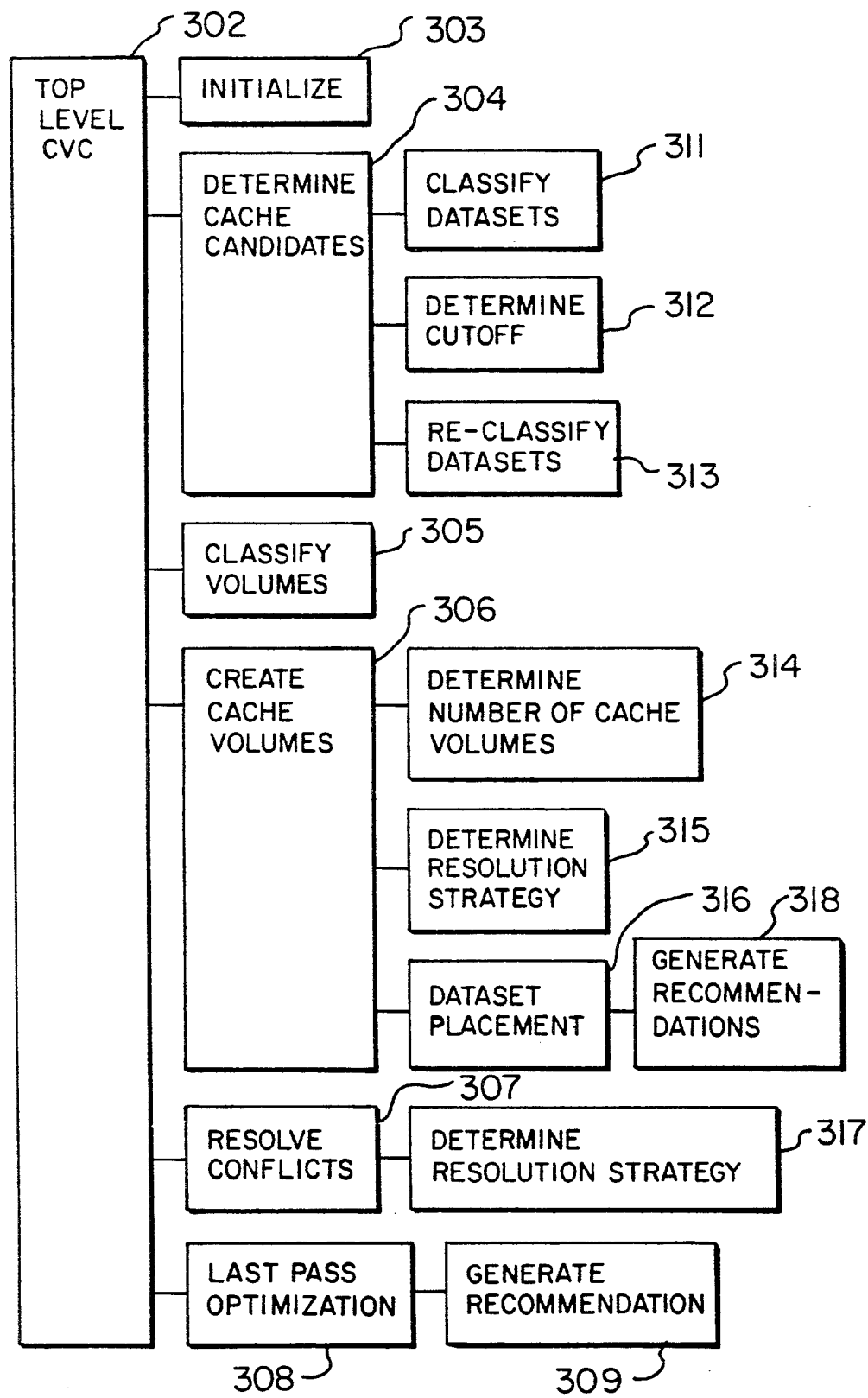
FIGS. 3 and 4 illustrate the elements that comprise the cache tuning and DASD performance optimizer elements of the computer system memory performance improvement apparatus.
Figure 4:
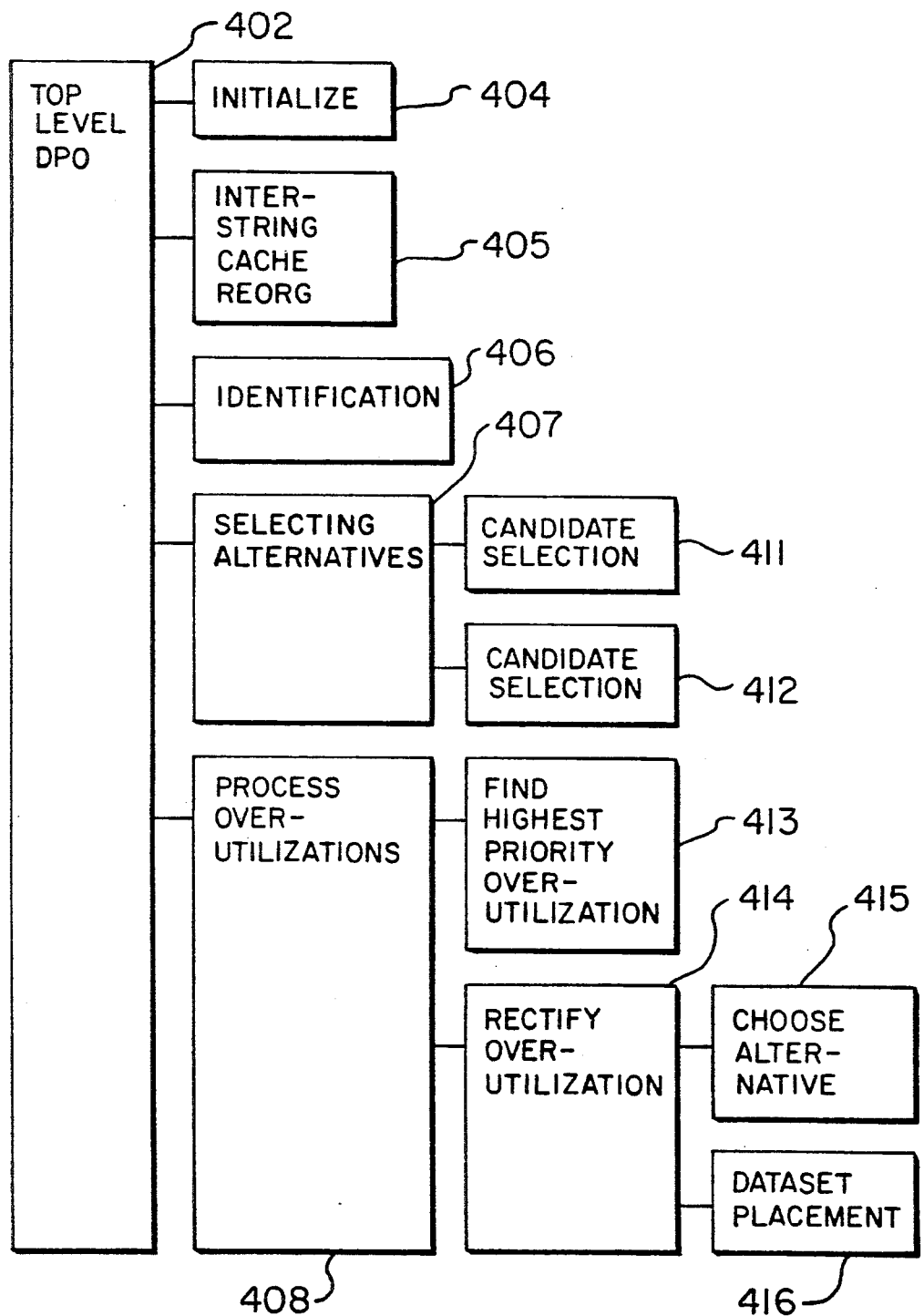

The cache volume creation module 302 contains the function entry point that is called by the scheduler 109. The cache volume creation module 302 then executes the sub-modules 303-308 as shown in FIG. 3. When the cache volume creation module 302 exits it calls operating system 102 to execute the list of recommended data set movements and update the knowledge database 108 with the recommendations.

On entry, a pointer to a subsystem record for the subsystem being analyzed is passed. This record contains the subsystem information and also contains a pointer to the list of volume records, one for each volume of the subsystem. Each of the volume records contains the volume information and a pointer to the list of data set records, one for each data set on the volume. Each data set record contains information on data set activity.

Initialize

The initialize module 303 performs the initialization required by the cache volume creation function including any data format conversion that needs to take place. The initialize module 303 also looks for data sets with moves scheduled for them. At the time the data is collected for analysis, these data set moves had not been completed, but by the time any moves recommended by the current analysis are performed, these moves will have been carried out. This means that the state of the machine is different from the time the data was collected to the time the data set move recommendations are implemented and so data set move recommendations are based on the system as it would look if the moves already scheduled had been performed. The initialize module 303 alters the input data to reflect this state of the system.

Determine Cache Candidates

The purpose of the determine cache candidates module 304 is to determine which data sets on the subsystem to place on cached volumes. First the routine Classify Data Sets 311 is called which classifies the data sets as good, bad, or inactive based on how well they will perform if they are cached. Then the routine Determine Cutoff 312 is called. This routine determines if there is too much cache candidate data on the subsystem for the size of the cache and if so determines a cutoff that reduces the amount of cache candidate data down to the best data sets the size of cache will cope with. The Reclassify Data Sets 313 routine then reclassifies the cache candidate data sets that fall below the cutoff and flags them for possible movement to another cache subsystem.

Classify Data Sets

The classify data set routine 311 classifies the data sets on the subsystem as good cache candidates, bad cache candidates, or inactive data sets. The classification is done by some simple rules of thumb based on the activity, the read percent, and the LORM of the data set. (The LORM is the Locality Of Reference Measure and is equal to the number of I/Os per second divided by the number of unique tracks accessed over the monitored period.)

As well as classifying the data sets as being good or bad cache candidates, the classify data sets module also classifies the good data sets into classes which reflect the degree to which the data set is suitable for caching. Thus, in selecting data sets to cache for the given cache size, the classify data sets module attempts to include the better cache candidates.

Rules

The rules used for classifying the data sets are shown below, where x, y and z are variables that are selected as optional for the particular device characteristics and the user's needs.

```
(1)
if      1.  there was no activity on the data set
then
        the data set is inactive
(2)
if      1.  the read% of the data set > x and
        2.  the LORM > y and
        3.  the I/O rate > z per second
then
        the data set is good
(3)
if      1.  (a) the read% < x or
            (b) the LORM < y or
            (c) the I/O rate < z per second and
        2.  there was some activity on the data set
then
        the set is bad
```

Determine Cutoff

The determine cutoff routine 312 is responsible for deciding which cache candidates identified by the classify data sets routine 311 should be cached based on the size of the cache. Starting with the best cache candidates, and based on attributes of the data sets such as activity, read percent, and LORM, the determine cutoff routine 312 works its way down the list of cache candidates until a sufficient number of cache candidates are selected for the available cache size. This is where the determine cutoff routine 312 determines there should be a cutoff with those data sets above the cutoff being cached. In deciding where the cutoff is, the determine cutoff routine 312 also looks at the currently cached data and the read hit rate of the cache and devices. This way, if the cache is being overloaded, some data sets can be moved off the cache volumes and flagged for possible movement off the subsystem. Similarly, if the cache is performing better than expected and can handle more data, some more cache candidates are moved onto the cache volumes. If the determine cutoff routine 312 determines that the given cache size can handle more than the amount of cachable data that is available on the subsystem, the determine cutoff routine 312 flags the subsystem as having an under-utilized cache.

Reclassify Data Sets

Using the cutoff determined by the determine cutoff routine 312, the reclassify data sets routine 313 reclassifies the data sets which fall below the cutoff as bad data sets and flags them for possible movement to another cache subsystem.

Classify Volumes

The classify volumes routine 305 classifies the volumes of the subsystem as being good, bad, or conflict volumes based on whether the volume is a good cache candidate, a bad cache candidate, or whether there is good cache data in conflict with bad cache data on the volume. The classify volumes routine 305 uses the classifications of the data sets to determine the classification of the volume. If the volume predominantly consists of good data sets, then the volume is classified as good. If the volume consists totally of bad data sets, then the volume is classified as a bad volume. If there is good data on the volume but there is also a significant amount of bad data, then there is a conflict between the good and bad data and the volume is classified as a conflict volume.

Rules

The rules used to perform the volume classification are shown below where n is a predetermined threshold selected as a function of the characteristics of the device being monitored and the needs of the user.

```
if      1.  there are no good data sets on the volume
then
        the volume is bad
(2)
if      1.  there is good data on the volume and
        2.  the amount of bad data accounts for
            more than n of the total activity
            of the volume
then
        the volume is a conflict volume
(3)
if      1.  there is good data on the volume and
        2.  the amount of bad data accounts for
            less than n of the total volume
            activity
then
        the volume is good
```

Create Cache Volumes

The create cache volumes routine 306 is responsible for deciding how many cache volumes there should be on the subsystem and creating them if there are not enough good volumes already in existence. First the determine number of cache volumes routine 314 is used to determine the desired number of cache volumes based on a predetermined device activity level and space constraints. The number of desired cache volumes is compared with the number of good cache volumes in existence to determine how many more good cache volumes must be created. The Determine Resolution Strategy routine 315 decides how to resolve the conflicts on conflict volumes. The determine resolution strategy routine 315 finds volume that will end up as good volumes by looking for volumes where the resolution strategy is to move the bad data sets off the volume. This is how the determine resolution strategy routine 315 creates the required number of cachable volumes. If there are not enough conflict volumes with a resolution strategy of moving the bad data sets, then the Create Cache volumes routine 306 finds volumes which require the least number of moves to turn into good volumes. The Data Set Placement routine 316 is used to decide where to relocate data sets needing movement to create cachable volumes.

Determine Number of Cache Volumes

The determine number of cache volumes routine 314 decides how many cache volumes there should be on the subsystem. It bases this decision on the space requirements of the identified cache candidates, the activity of the cache and non-cache candidates, the anticipated read hit rate of the cache and the devices, and the amount of space on the whole subsystem. The aim is to have enough cache volumes that device busy queuing is not a problem and space requirements for cache data are met, as well as trying to minimize device contention problems and space problems on non-cache volumes.

Resolve Conflicts

The resolve conflicts routine 307 processes the remaining conflict volumes by resolving the conflicts on the volumes. A conflict is where there is cache data and a significant amount of non-cache data residing on the same volume. The volume can't be cached because the bad data would degrade the performance of the cache too much. The resolve conflicts routine 307 decides on a resolution strategy, and then implements the strategy.

The resolution strategy is determined by the Determine Resolution Strategy routine 317 and can be one of
1. move good,
2. move bad, or
3. salvage good.

That is, in order to resolve the conflict, one of the following actions can be selected
1. move the good data sets to good volumes,
2. move the bad data sets to bad volumes, or
3. salvage as many good data sets as we can by moving the movable good data sets with significant activity to good volumes.

Once the resolution strategy has been directed, the Data Set Placement routine 317 is used to decide where to move the identified data sets.

Determine Resolution Strategy Routine

Given a conflict volume, the best way of eliminating the conflict must be determined, that is, the best way to separate the good and bad data from each other. The good data sets can be relocated off the volume, the bad data sets can be relocated off the volume, or as many good data sets as possible can be salvaged.

Salvaging the good data sets is used as a last resort where it is not possible to move the bad data sets off the volume due, perhaps, to immovable data sets or the number of moves involved and it is similarly not possible to move all of the good data sets off the volume. Under these circumstances, good data sets are salvaged by moving those good data sets that have significant activity and which are movable.

In referencing bad data sets on a conflict volume, what is actually meant is a selected subset of the bad data sets. A good volume can still have bad data sets on it as long as the activity due to the bad data sets is less than n of the volume activity. Thus, in order to turn a conflict volume into a good volume enough bad data sets must be moved to reduce the bad activity to this level. The selected bad data sets are then those which if moved off the volume would reduce the amount of bad activity to below 20% of the volume activity.

The factors which influence the decision about which resolution strategy to use are listed below.
1. immovable bad
2. immovable good
3. willing to move bad
4. willing to move good
5. which needs more moves
6. which has more activity
7. good data sufficiently active
8. which is more immovable
9. some bad is totally immovable
10. some good is totally immovable
11. enough unwilling good Each of these factors is represented as an attribute of the conflict volume whose value is derived from input data and other attributes. The derivation of the value of the above attributes and the attributes from which these values are obtained are explained in detail in later sections.

Rules

The rules which use these factors to decide on a strategy to use to resolve the conflict are shown below.

---

(1)
If    1. there are no immovable bad data sets
and
2. there are some totally immovable bad data sets
Then the resolution strategy is ERROR (2)
If    1. there are no immovable good data sets
and
there are some totally immovable good data sets
Then the resolution strategy is ERROR (3)
If    1. the good and bad data are equally immovable and
2. there are some immovable good data sets and
3. there are no immovable bad data sets
Then the resolution strategy is ERROR (4)
If    1. the good and bad data are equally immovable and
2. there are some immovable bad data sets and
3. there are no immovable good data sets
Then the resolution strategy is ERROR (5)
If    1. the good and bad data are equally immovable and
2. there are some totally immovable good data sets and
3. there are no totally immovable bad data sets
Then the resolution strategy is ERROR (6)
If    1. good and bad data are equally immovable and
2. there are some totally immovable bad data sets and
3. there are no totally immovable good

```
                                    data sets
Then    the resolution strategy is ERROR
(7)
If      1. the good data is more immovable and
        2. There are no immovable good data sets
Then    the resolution strategy is ERROR
(8)
If      1. the bad data is more immovable and
        2. there are no immovable bad data sets
Then    the resolution strategy is ERROR
(9)
If      1. the good data is more immovable and
        2. there are some totally immovable bad
           data sets
Then    the resolution strategy is ERROR
(10)
If      1. the bad data is more immovable and
        2. there are some totally immovable good
           data sets
Then    the resolution strategy is ERROR
(11)
If      1. we are willing to move all of the good
           data sets and
        2. we are not willing to move the bad data
           and
        3. there are no immovable good data sets
Then    the resolution strategy is MOVE_GOOD
(12)
If      1. we are willing to move the bad data
           and
        2. we are not willing to move all of the
           good data sets and
        3. there are no immovable bad data sets
           and
        4. there is enough unwilling good data to
           justify any extra moves required to
           move the bad data
Then    the resolution strategy is MOVE_BAD
(13)
If      1. we are willing to move all of the
           good data sets and
        2. we are not willing to move the bad data
           and
        3. there are some immovable good data sets
           and
        4. the good data is sufficiently active
           and
        5. there are no totally immovable good
           data sets
Then    the resolution strategy is MOVE_GOOD
(14)
If      1. we are willing to move the bad data
           and
        2. we are not willing to move all of the
           good data sets and
        3. there are some immovable bad data sets
           and
        4. the good data is sufficiently active
           and
        5. there is enough unwilling good data to
           justify any extra moves required to
           move the bad data and
        6. there are no totally immovable bad data
           sets
Then    the resolution strategy is MOVE_BAD
(15)
If      1. we are willing to move all of the
           good data sets and
        2. we are willing to move the bad data
           and
        3. there are no immovable good data sets
           and
        4. there are no immovable bad data sets
           and
        5. the good data requires more moves
Then    the resolution strategy is MOVE_BAD
(16)
If      1. we are willing to move all of the
           good data sets and
        2. we are willing to move the bad data
           and
        3. there are no immovable good data sets
           and
        4. there are no immovable bad data sets
           and
        5. the bad data requires more moves
Then    the resolution strategy is MOVE_GOOD
(17)
If      1. we are willing to move all of the
           good data sets and
        2. we are willing to move the bad data
           and
        3. there are no immovable good data sets
           and
        4. there are no immovable bad data sets
           and
        5. the good and bad data require the
           same number of moves and
        6. the good data has more activity
Then    the resolution strategy is MOVE_BAD
(18)
If      1. we are willing to move all of the
           good data sets and
        2. we are willing to move the bad data
           and
        3. there are no immovable good data sets
           and
        4. there are no immovable bad data sets
           and
        5. the good and bad data require the same
           number of moves and
        6. the bad data has higher activity
Then    the resolution strategy is MOVE_GOOD
(19)
If      1. We are willing to move all of the
           good data sets and
        2. we are willing to move the bad data
           and
        3. there are some immovable good data sets
           and
        4. there are no immovable bad data sets
Then    the resolution strategy is MOVE_BAD
(20)
If      1. we are willing to move all of the
           good data sets and
        2. we are willing to move the bad data
           and
        3. there are no immovable good data sets
           and
        4. there are some immovable bad data sets
Then    the resolution strategy is MOVE_GOOD
(21)
If      1. we are willing to move all of the
           good data sets and
        2. we are willing to move the bad data
           and
        3. there are some immovable good data sets
           and
        4. there are some immovable bad data sets
           and
        5. the good data is sufficiently active
           and
        6. the good data is more immovable than
           the bad data and
        7. there are no totally immovable bad data
           sets
Then    the resolution strategy is MOVE_BAD
(22)
If      1. we are willing to move all of the good
           data sets and
        2. we are willing to move the bad data
           and
        3. there are some immovable good data sets
           and
        4. there are some immovable bad data sets
           and
        5. the good data is sufficiently active
           and
        6. the bad data is more immovable than
           the good data and
        7. there are no totally immovable good
           data sets
Then    the resolution strategy is MOVE_GOOD
(23)
```

If  1. we are willing to move all of the good data sets and
    2. we are willing to move the bad data and
    3. there are some immovable good data sets and
    4. there are some immovable bad data sets and
    5. the good data is sufficiently active and
    6. the good and bad data are equally immovable and
    7. there are no totally immovable good data sets and
    8. there are no totally immovable bad data sets and
    9. the good data requires more move
Then the resolution strategy is MOVE_BAD
(24)
If  1. we are willing to move all of the good data sets and
    2. we are willing to move the bad data and
    3. there are some immovable good data sets and
    4. there are some immovable bad data sets and
    5. the good data is sufficiently active and
    6. the good and bad data are equally immovable and
    7. there are no totally immovable good data sets and
    8. there are no totally immovable bad data sets and
    9. the bad data requires more moves
Then the resolution strategy is MOVE_GOOD
(25)
If  1. we are willing to move all of the good data sets and
    2. we are willing to move the bad data and
    3. there are some immovable good data sets and
    4. there are some immovable bad data sets and
    5. the good data is sufficiently active and
    6. the good and bad data are equally immovable and
    7. there are no totally immovable good data sets and
    8. there are no totally immovable bad data sets and
    9. the good and bad data require the same number of moves and
    10. the good data has higher activity
Then the resolution strategy is MOVE_BAD
(26)
If  1. we are willing to move all of the good data sets and
    2. we are willing to move the bad data and
    3. there are some immovable good data sets and
    4. there are some immovable bad data sets and
    5. the good data is sufficiently active and
    6. the good and bad data are equally immovable and
    7. there are no totally immovable good data sets and
    8. there are no totally immovable bad data sets and
    9. the good and bad data require the same number of moves and
    10. the bad data has higher activity
Then the resolution strategy is MOVE_GOOD
(27)
If  1. we are not willing to move all of the good data sets and
    2. we are not willing to move the bad data
Then the resolution strategy is SALVAGE_GOOD
(28)
If  1. there are some totally immovable good data sets and
    2. there are some totally immovable bad data sets
Then the resolution strategy is SALVAGE_GOOD
(29)
If  1. there are some immovable good data sets and
    2. there are some immovable bad data sets and
    3. the good data is not sufficiently active
Then the resolution strategy is SALVAGE_GOOD
(30)
If  1. we are willing to move all of the good data sets and
    2. we are not willing to move the bad data and
    3. there are some immovable good data sets and
    4. ( there are some totally immovable good data sets or
    5. the good data is not sufficiently active )
Then the resolution strategy is SALVAGE_GOOD
(31)
If  1. we are willing to move the bad data and
    2. we are not willing to move all of the good data sets and
    3. there are no immovable bad data sets and
    4. there is not enough unwilling good data to justify any extra moves required to move the bad data
Then the resolution strategy is SALVAGE_GOOD
(32)
If  1. we are willing to move the bad data and
    2. we are not willing to move all of the good data sets and
    3. there are some immovable bad data sets and
    4. ( the good data is not sufficiently active or
    5. there is not enough unwilling good data to justify any extra moves required to move the bad data or
    6. there are some totally immovable bad data sets )
Then the resolution strategy is SALVAGE_GOOD

Immovable Bad

This attribute is true if there are any bad data sets (in the subset already selected) which are immovable.

Immovable Good

This attribute is true if any of the good data sets on the volume are immovable.

Willing to Move Bad

This attribute is true if we are willing to move the bad data sets off the volume. That is, it is true if the number of moves required to move the bad data sets is less than or equal to the number of moves we are willing to make.

The value of this attribute depends on the value of two other attributes:

moves willing, and
number of moves to move bad.

Willing to Move Good

This attribute is true if the decision is made to move all of the good data sets off the volume. With the bad data sets, the number of moves it took to move the data sets is compared with a selected number of moves to make to determine whether to move the bad data sets. With the good data sets though, the data sets may be move candidates based on the number of moves selected, but not selected to move because there are some good data sets which aren't worth moving due to their low activity. So, this attribute is true if all of the good data sets are worth moving and the number of moves required is less than or equal to a selected number of moves.

This attribute depends on the value of these attributes:
moves willing, and
number of moves to move good.

Which Needs More Moves

The value of this attribute indicates whether it takes more moves to move the good data sets off the volume or whether it takes more moves to move the bad data sets. The values it can take are:
good,
bad, or
same.

This attribute depends on the value of the following attributes:
number of moves to move bad. and
number of moves to move good.

Which Has More Activity

The value of this attribute indicates whether the activity of the good data is greater than or equal to the bad data or whether the bad data has more activity than the good data. The values it can take are:
good, or
bad.

Good Data Sufficiently Active

This attribute is true if the combined activity of the good data is sufficiently active to consider moving immovable data sets. This decision is based on the activity of the good data on the volume relative to the total amount of good activity on the subsystem and also on the importance of obtaining more cache data.

The value of this attribute depends on the following attributes:
activity classification, and
importance of obtaining more cache data.

Rules

The rules used to determine whether the good data is sufficiently active are shown below.

```
(1)
if    1. the good data has moderate activity and
      2. it is very important to obtain more
         cache data
then
      the good data is sufficiently active
(2)
if    1. the good data has a high activity and
      2. it is very important to obtain more
         cache data
then
      the good data has sufficient activity
```

```
-continued
(3)
if    1. the good data has very high activity
then
      the good data has sufficient activity
```

Which is More Immovable

The value of this attribute indicates which of the good and bad data is more immovable than the other. At the moment, one type of data is more immovable than the other if the most immovable data set of the first type is more immovable than the most immovable data set of the other type. The values the attribute can have are:
good,
bad, or
same.

Some Bad Totally Immovable

This attribute is true if there is at least one bad data set which is totally immovable and must not be moved under any circumstances. For example VTOCs must never be moved for any reason.

Some Good Totally Immovable

This attribute is true if some of the good data sets ar totally immovable.

Enough Unwilling Good

When there are good data sets that are not move candidates (because their activity is not high enough), this parameter indicates whether there are enough of these unwilling data sets to justify any extra moves it might take to move the bad data sets off the volume. The alternative is to try and move the good data sets that we are willing to move and leave the unwilling good data sets behind to end up on a bad volume. This attribute is true if the combined activity of the unwilling good data sets is enough to justify any extra moves required in moving the bad data sets off the conflict volume.

Number of Moves to Move Bad

The value of this attribute indicates the number of moves it will take to move the bad data sets off the conflict volume. The number of moves is determined by the Data Set Placement module.

Number of Moves to Move Good

This attribute gives the number of moves required to move all of the good data sets off the conflict volume. The number of moves is determined by the Data Set Placement module.

Moves Willing

When making movement recommendations, the procedure is to minimize the number of moves. For each conflict volume there is a number of moves that can be made based, principally, on the activity of the good data relative to the total amount of good data on the subsystem. So, where there is a lot of good data, more moves are desireable and where there is only a small amount of good data fewer moves are desireable. As well as the activity of the good data, the value of the attribute importance of obtaining more cache data is scrutinized. If it is important to put more cache data on the cache volumes then the number of moves permitted is correspondingly higher.

Rules

The rules used for determining the number of moves are shown below.

```
(1)
if    1.  the activity of the good data set is X%
          of the total amount of good data on the
          subsystem and
      2.  it is not important to obtain more
          cache data
then
      the number of moves we are willing to make
      for this data set is X/5
(2)
if    1.  the activity of the good data set is X%
          of the total amount of good data on the
          subsystem and
      2.  it is important to obtain more cache
          data
then
      the number of moves we are willing to make
      is 1.5 * X/5
(3)
if    1.  the activity of the good data set is X%
          of the total amount of good data on the
          subsystem and
      2.  it is very important to obtain more
          cache data
then
      the number of moves permitted
      is 2 * X/5
```

Importance of Obtaining More Cache Data

This attribute reflects how important it is to obtain more cache data. Of course, it is always important to obtain more cache data but this attribute indicates whether it is more important than usual or not. The decision about whether it is important to obtain more cache data is based on the amount of cache data so far obtained and the amount anticipated. The possible values for this attribute are:
not important,
important, or
very important.

The way that this module measures the amount of good data it anticipates will end up on good volumes is to measure the amount of good data on easily resolved conflict volumes and add this to the amount of good data already residing on good volumes. This method gives a very rough measure that is used to determine whether to work harder at getting more good data onto cache volumes.

The concept of easily resolved conflicts is used to try and predict how much good data will end up cachable. The simplistic approach taken is to assume that the amount of good data that is not already cachable but that will end up cachable is about the same as the amount of good data currently residing on easily resolved conflict volumes.

Rules

The rules that are used to determine the importance of obtaining more cache data are shown below where r and s are user selected variables.

```
(1)
if    1.  the amount of good data on good volumes
          is < r of total good measure by
          activity and
      2.  there is < r total good data (by
          activity) on easily resolved conflict
      volumes
then
      it is very important to get more cache data
(2)
if    1.  if between r and s of the good data
      (by activity) is cachable and
      2.  there is < r total good on easily
          resolved
then
      it is important to get more cache data
(3)
if    1.  more than s total good data is
          cachable
then
      it is not important to get more cache data
(4)
if    1.  there is < r total good data on good
      volumes and
      2.  there is between r and s total good
      on easily resolved conflict volumes
then
      it is important to get more cache data
```

Easily Resolved Conflicts

In order to determine the importance of obtaining more cache data it is necessary to measure the amount of good data on easily resolved conflict volumes. A conflict volume is considered to be easily resolved if:

```
1.  there are no immovable bad data sets, and
2.  the number of moves we are willing to make
    for the good data is greater than or equal
    to the number of bad data sets that would
    have to be moved to turn the volume into a
    good volume.
```

Activity Classification

This module is used to classify the activity of some good data. The classification is one of:
low,
moderate,
high, or
very high.

The classification is based on the percentage of the total amount of good activity on the subsystem attributable to the good data being classified.

Rules

The rules used are shown below where t, u and v are preselected variables that are a function of device characteristics and user needs.

```
(1)
if    1.  the activity of the good data is >= t
of total good activity
then
      the activity is very high
(2)
if    1.  the activity of the good data is >= u
of total good and
      2.  the activity is >= t total good
then
      the activity is high
(3)
if    1.  the activity is >= v total good and
      2.  the activity is < u total good
then
```

-continued

| | | |
|---|---|---|
| (4) | | the activity is moderate |
| if | 1. | the good data has some activity and |
| | 2. | the activity is < v total good |
| then | | |
| | | the activity is low |

Salvage Good Data

During conflict resolution, the preferred options for resolving the conflict are to move all of the selected bad data sets off the volume or to move all of the good data sets off the volume. However, due to immovable data sets or the activity of the good data not being high enough to warrant the number of moves needed, it is possible that neither of these two options can be recommended. In this case the result of the resolution process is to recommend that the good data on the volume be salvaged. The salvage operation consists of examining each good data set on its own to determine whether it is worth moving to a good volume, thus making it cachable.

If a good data set is not immovable, then it is worth salvaging if the number of moves permitted is enough to move it. If a good data set is immovable but not totally immovable, then not only does the number of moves permitted have to be enough to move it, but it has to have sufficient activity to warrant its movement off the volume. A totally immovable good data set can never be salvaged.

Rules

The above conditions for salvaging a good data set can be expressed as the rules shown below.

| | | |
|---|---|---|
| (1) | | |
| if | 1. | we are willing to move the good data set and |
| | 2. | the data set is not immovable |
| then | | |
| | | move the data set |
| (2) | | |
| if | 1. | we are willing to move the good data set and |
| | 2. | the data set is immovable and |
| | 3. | the data set has sufficient activity |
| then | | |
| | | move the data set |

Data Set Placement

The data set placement routine 316 is used to decide where to place data sets that have been identified for movement. It attempts to recommend placement of a data set on the least active volume of the same classification on which it will fit. If there are no matching volumes on which the data set will fit, the data set placement routine 316 tries to find another data set on a matching volume that, when moved to another matching volume, frees enough space for the original data set. As a last resort the data set placement routine 316 considers moving the data set to another conflict volume for processing at a later date when hopefully it is easier to place.

When a place has been found for a data set to be moved to, a recommendation is generated and placed on the end of the list of current recommendations by calling the Generate Recommendations routine 318.

As well as actually placing data sets, the data set placement routine 316 is used during the conflict resolution process to determine how many moves are necessary to move a given set of data sets off a volume. This information is then used when deciding which of the good and bad data need more moves to be moved off a conflict volume.

Generate Recommendations

This routine takes data set movements and adds them to the list of current recommendations.

Last Pass Optimization

Just before the cache volume creation routine 302 finishes its analysis, the last pass optimization routine 308 is called in an attempt to find good volumes where one or two movements will result in a dramatic performance increase. The last pass optimization routine 308 looks at all of the good or cache candidate volumes and identifies where there are still one or two moderately high activity bad data sets that could be moved off the volume to increase the cache suitability of the volume.

If there is a bad data set on a good volume that accounts for more than a certain percentage of the total volume activity and can be moved off with only one move, then the movement of the data set off the volume is recommended (309). Similarly, if there is a bad data set on a good volume that accounts for more than a predetermined percentage of the total volume activity and it can be moved, then it is recommended (309) for movement off the volume.

DASD Performance Optimizer

The DASD Performance Optimizer (DPO) module 106 is one of the tuning analysis routines of the computer system memory performance improvement apparatus 103. The DASD performance optimizer module 106 uses Expert System and artificial intelligence techniques to analyze the performance of the DASD devices in an installation and make recommendations of data set movements that improve I/O performance.

The purpose of the DASD performance optimizer module 106 is to make data set movement recommendations with the aim of improving the performance and utilization of the DASD devices. The module tries to minimize the number of movements recommended. The recommendations are based on data that has been collected as a result of monitoring the I/O activity and characteristics of the devices. The module works in such a way as to prevent problems occurring rather than waiting for problems to occur before doing anything about them. The DASD performance optimizer module 106 identifies devices and subsystems where problems could occur or where there is already a problem, and makes a few data set movement recommendations that will rectify the situation. In this way, data sets are moved from over-utilized volumes and subsystems to under-utilized volumes and subsystems. The DPO module 402 also identifies where there are cache candidate data sets that could be moved to subsystems whose cache is being under-utilized. If necessary, it also moves data sets off cache subsystems when the cache on the subsystem is over-loaded.

When any initial setup that is required has been done by operating system 102, it calls the DPO module 402 as a subroutine passing any information the module requires in a specified format. When the DPO module 402 terminates, it returns to the operating system 102 which performs any cleaning up that is needed before exiting.

DASD Performance Optimizer

After some initialization, the DASD performance optimizer module 402 tries to reorganize data sets that have been flagged for movement by the Cache Volume Creation module 105 so that they end up under cache controllers. The subsystems and volumes that have problems or potential problems are identified. Then sets of data sets on these subsystems and volume are identified, whose movement would rectify the situation. Each of the over-utilizations identified are then processed ordered by their priority and three alternative data set combinations are selected for each. The processing involves choosing the best of the sets of data sets, deciding where to move them, and generating appropriate recommendations.

The DASD performance optimizer module 402 controls the high level flow of exeuction and it calls operating system 102 to execute the list of data set move recommendations and to write these recommendations to the knowledge database 108.

Initialize

The initialize routine 404 performs any initialization required including reformatting data if this is needed. This initialization process includes reading information from the database to create internal records for the data storage complex, each subsystem in the complex and each volume in each subsystem for which a record in the database exists. The initialization routine 404 also obtains pool and host sharing information about each of the volumes stored in the data storage system and creates objects for each of the compatability classes that exist. A compatibility class is a combination user pool, set of sharing hosts and cachability type. If any moves are scheduled for data sets, then initialize routine 404 alters the data to reflect the state the system would be in if the movements had been executed. The reason for doing this is that any recommended movements are executed after any moves that have been already scheduled and so data set move analysis is based on the assumption that the moves have been carried out.

Inter-Subsystem Cache Reorganization

The Inter-Subsystem Cache Reorganization routine 405 exists to support the movement of cache candidate data sets across subsystem. The cache volume creation function identifies where there are under-utilized caches and also where there are cache candidate data sets that can't be cached due to a lack of cache space on the subsystem. DASD performance optimizer module 402 then looks for under-utilized caches and tries to find cache candidate data sets that have been flagged for movement that it can move to these cache subsystems.

The DASD performance optimizer module 402 uses the cache suitability classification that cache volume create 302 gives each cache candidate data set to decide which data sets should be moved to which subsystems. If the DASD performance optimizer 402 finds that there is a log of good cache candidate data that is uncached and that there is not enough cache capacity on any of the cached subsystems, then this module writes out a message to user recommending that the user buy some more cache.

Identification

The job of the identification module 406 is to find subsystems and volumes which are over-utilized. A volume or subsystem becomes a problem when the amount of activity is such that the amount of queuing for the device or for a path is unacceptable. Volumes or subsystems are identified as over-utilized when they reach an activity level above some safety margin below the unacceptable level. This safety margin allows actual problems to be corrected as well as preventing problems from arising by detecting places that potentially could become problems.

The detection of these over-utilizations is based on the percent busy of a device or path, and the number of paths. The percent busy measures are derived from the number of I/Os per second, the average data size transferred, the channel speed, the device service time, and the number of paths. As well as identifying which devices and subsystems are over-utilized this module also decides how much data needs to be moved off the device or subsystem. This is represented by an amount of path time per second or device time per second that we need to reduce by.

Rules

Some examples of the sort of rules that might be used for determining whether a device or subsystem is over-utilized are shown below where a and b are predetermined variables.

---

(1)
if   a subsystem is not a cache subsystem and
    it is a subsystem of 8380 class devices and
    there are two paths and
    there is not actuator level buffering (ALB)
and
    the paths are more than a busy
then
    the subsystem is over-utilized (2)
if   a device is on a non-cache subsystem and
    it is an 8380 class device and
    the device is more than b busy
then
    the device is over-utilized (3)
if   a subsystem is a cache subsystem and
    there are two paths and
    the devices are 8380 class devices and
    there is not ALB and
    the paths are more than a busy (due to staging and I/O path time)
then
    the paths are over-utilized

---

Identification module 406, in addition to identifying over-utilized subsystems and volumes, calculates the degree of over-utilization of each of these over-utilized subsystems. For example, where a particular subsystem has been identified as over-utilized, identification module 406 determines the amount of activity handled by this subsystem by for example adding up all of the input and output activities to the various volumes that constitute this subsystem. The identification module 406 then determines the capacity of the subsystem for extra activity. That is, it determines the number of extra input and output operations that the subsystem could handle without becoming overloaded. Once this calculation is completed, identification module 406 assigns a classification attribute to this particular subsystem which attribute is indicative of the degree ov over-utilization of the subsystem. This procedure is followed for each subsystem in the entire system that has been identified as over-utilized and similarly for each volume that has been identified as over-utilized.

Selecting Alternatives

Once the over-utilizations have been identified, the selecting alternatives routine 407 finds combinations of data sets that when moved off the volume or subsystem will solve the problem. The selecting alternatives routine 407 selects three alternate combinations, known as alternatives for each over-utilized volume or subsystem. Each alternative is a set of data sets whose movement off the volume or subsystem will rectify the over-utilization. The reason for selecting three alternatives is so that, the over-utilization process, if there is a shortage

Candidate Generation

The candidate generation routine 411 generates candidate combinations of data sets whose combined activity is enough to rectify the over-utilization if they were moved off the volume or subsystem. Candidate generation routine 411 determines the availability of space and activity capacity for each of the volumes in the compatibility class to which an identified over-utilized volume is assigned. The availability measure is a variable that indicates how much available space and activity capacity is available on each volume. Greater significance is given to the occurrence of both space and activity capacity on a volume rather than the availability of one or the other. In addition, the same calculation is performed to identify the possibility of moving data sets from one subsystem to another subsystem. This is the case where all of the volumes in the compatibility class reside on more than one subsystem in the system. Therefore, relocating a data set to a different subsystem maintains the data set within the same compatibility class but reduces the level of utilization of the subsystem that initially had the data set stored thereon. In order to reduce the number of data sets that have to be considered, a threshold is calculated and data sets with an activity below the threshold are ignored. When generating the combinations, immovable data sets are excluded and the combined activity of the data sets are selected close to that required for movement. In selecting candidates for fixing a subsystem problem, candidates are identified that would also solve any volume problems there may be within the subsystem.

Candidate Selection

The candidate selection routine 412 selects three candidates to be the alternatives for a volume or subsystem. In performing this operation, candidate selection routine 412 calculates a measure of the difficulty of placement of a data set on another volume. This measure indicates the anticipated difficulty in moving the data set from its present location on a particular over-utilized volume to another candidate volume that is not over-utilized and yet in the same compatibility class. In investigating the placement of a data set, the candidate selection routine 412 determines whether the destination volume is compatible with the source volume. That is, the destination volume must be shared by the same set of hosts as the source volume, and must also be in the same user defined pools. In addition, candidate selection routine 412 attempts to move non-cache data sets to non-cache volumes. Apart from finding a volume compatible with the source volume of the data set, candidate selection routine 412 must locate a volume that enough room for the data set and one which has enough capacity for extra activity resultant from the relocation of the data set. One of the goals used in the selection process is to try to minimize the number of data sets in an alternative because we are trying to minimize the number of moves that need to be performed. It is still possible that some of the candidate alternatives have immovable data sets in them so another goal of the selection process is to try not to select alternatives with immovable data sets. Large data sets are excluded from alternatives and to select alternatives for a subsystem that solve any volume problems within the subsystem. Another goal is trying to make the three alternatives different from each other so that being unable to move one alternative won't necessarily mean another can't be moved.

Process Over-Utilization

The Process Over-Utilization routine 408 processes all of the over-utilizations by finding the one with the highest priority and calling the Rectify Over-Utilization routine 414 to fix it. The intention is that over-utilizations that are severely impacting the I/O sub-system or over-utilizations that are difficult to fix should get a high priority and be processed first.

Find Highest Over-Utilization

The priority of an over-utilization is based on the degree of over-utilization and the degree of difficulty anticipated in rectifying the over-utilization. The degree of difficulty is based on how much space and activity capacity is available and how much, based on the selected alternatives, a given over-utilization will need. The degree of over-utilization is based on the degree to which I/O performance is degraded for that device or subsystem. To find the highest priority over-utilization, the find highest priority over-utilization routine 413 balances the degree of over-utilization and the degree of difficulty.

Rectify Over-Utilization

Given an over-utilization, the rectify over-utilization routine 414 fixes the problem by deciding which set of data sets to move off the volume or subsystem and where to move them to. This is achieved by calling the Choose Alternative routine 415 to decide which alternative to move off the volume or subsystem. The Data Set Placement routine 416 is then used to decide where to put the data sets of the alternative.

Choose Alternative

The choose alternative routine 415 chooses the alternative to move by picking the best one for whose data sets there is space and activity capacity available.

Data Set Placement

The data set placement routine 416 decides the best place to put data sets. Data sets that reside on shared volumes must only ever be moved to volumes that are shared by the same hosts and the movement of a data set should not cause the destination volume to become over-utilized. If the data set placement routine 416 finds that there is not enough space available for the data set it will consider moving one other data set to make enough room.

Data set placement routine 416 moves the data set from an over-utilized volume or subsystem to an under-utilized volume on an under-utilized subsystem. In the process of deciding where to move the data set to, one other data set may be moved to make room or to make enough activity capacity available. The list of moves done to achieve moving the original data set stored in memory. There are two different ways that a data set can be placed. The first is where there are under-utilized volumes on under-utilized subsystems which are in the same compatibility class as the data set and on which the data set will fit. In this case, data set placement routine 416 places the data set on the one of the volumes in this subsystem that has the least activity. The second manner in which the data set can be placed is the situation where there are no volumes that satisfy the above criteria. In this case, data set placement routine 416 identifies a pair of volumes of the same type such that if a data set is moved from one of them to the other, this move will make enough room or activity capacity available for the original data set.

Summary

The memory performance improvement apparatus identifies memory performance conflicts, such as a performance degradation of the computer system data storage devices due to a plurality of computers in the computer system attempting to access a common data storage device. The memory performance improvement apparatus identifies the performance conflict as well as the data sets stored on these data storage devices related to this conflict. Once the data sets involved in the performance conflict are identified, the memory performance improvement apparatus determines alternative memory storage locations for these data sets and activates various software routines to transport these conflict data sets to the alternative data storage locations. The relocation of these conflict data sets resolves the memory performance conflict and improves the retrievability of the data stored on these data storage devices. By performing the conflict identification and resolution on a dynamic real time basis, the data storage devices of the computer system are operated in a more efficient manner and the retrievability of the data stored on these data storage devices is significantly improved without the need for the data management personnel. The computer system memory performance improvement apparatus therefore continuously monitors and modifies the performance of the data storage devices associated with the computer system.

While a specific embodiment of the invention has been illustrated, it is expected that those skilled in the art can and will devise variations of this system that fall within the scope of the appended claims.

I claim:

1. In a computer system connected to a data storage subsystem having a cache memory and a predefined configuration of a plurality of data storage devices, a system, located in said data storage subsystem, for dynamically reorganizing the placement of data records on said data storage devices, independent of said host computer, to improve the retrievability of data records stored on said data storage devices comprising:

means for storing information describing said predefined configuration of said data storage devices;

means for storing a set of functional rules describing a data management function;

means for monitoring data record read/write activity on said data storage devices;

means, responsive to said configuration storing means, monitoring means and rule storing means, for dynamically evaluating the allocation of all data records on all said data storage devices to detect memory performance conflicts in said data storage devices; and means, responsive to said evaluating means, for automatically identifying data records on said data storage devices that must be relocated to resolve said memory performance conflicts, comprising:

means for classifying all data records on a data storage device that are good and bad candidates for relocation to said cache memory, means for listing ones of said data records, classified as good candidates for relocation to said cache memory, that can be stored on one volume in said data storage device.

2. The system of claim 1 further comprising:

means, responsive to said identifying means, for automatically transporting said identified data records to alternate memory storage locations on said data storage devices to resolve said memory performance conflicts.

3. The system of claim 1 wherein said monitoring means comprises:

means for storing data indicative of read/write activity of said data records in said data storage devices.

4. The system of claim 3 wherein said evaluating means comprises:

means for calculating statistical data from said stored data indicative of data record read/write activity indicative of frequency of usage and locale of data records stored in said data storage devices.

5. The system of claim 4, wherein said data storage devices include a plurality of DASD units, said identifying means further comprises:

means for listing ones of said DASD units that are most and least utilized.

6. The system of claim 5 wherein said identifying means further comprises:

means, responsive to said listing means, for selecting data records from ones of said DASD units listed as most utilized and from ones of said DASD units listed as least utilized for exchange therebetween to balance activity on these listed DASD units.

7. The system of claim 6 further comprising:

means, responsive to said identifying means, for exchanging said selected data records between said listed DASD units to balance the activity on these listed DASD units.

8. The system of claim 1 further comprising:

means, responsive to said identifying means, for automatically transporting said listed data records to said one volume in said data storage device to resolve said memory performance conflicts.

9. A method of operating a computer system memory to improve the data record retrieval efficiency of a computer system memory which includes a cache memory and a predefined configuration of a plurality of data storage devices, comprising the steps of:

recording in said computer system memory information describing said configuration of said data storage devices;

storing a set of functional rules in said computer system system memory describing a computer system memory management function;

continually monitoring the operation of said data storage devices;

dynamically evaluating the allocation of all data records on said data storage devices to detect memory performance conflicts as a result of said monitoring;
identifying data records in said data storage devices that must be relocated on said data storage devices to resolve said memory performance conflicts, comprising:
classifying all data records on a data storage device that are good and bad candidates for relocation to said cache memory,
listing ones of said data records, classified as good candidates for relocation to said cache memory, that can be stored on one volume in said data storage device.

10. The method of claim 9 wherein said step of evaluating comprises:
monitoring read/write activity of said data records in said data storage devices.

11. The method of claim 10 wherein said step of evaluating further comprises:
calculating statistical data from said monitored data record read/write activity indicative of frequency of usage and locale of date records stored in said data storage devices.

12. The method of claim 11 where said computer system memory includes a plurality of DASD units, said step of identifying further comprises:
listing ones of said DASD units that are most and least utilized; and
selecting data records from ones of said DASD units listed as most utilized and from ones of said DASD units listed as least utilized for exchange therebetween to balance the activity on these listed DASD units.

13. The method of claim 12 wherein said step of identifying further comprises:
exchanging said selected data records between said most utilized and least utilized DASD units to balance the activity of these listed DASD units.

14. The method of claim 9 further comprising the step of:
automatically transporting said listed data records to said one volume in said data storage devices to receive said memory performance conflicts.

15. A system for dynamically reorganizing the placement of data in memory of a computer system, independent of said computer system, to improve the retrievability of data records stored therein, wherein said computer system memory is a hierarchial memory, which includes a predefined configuration of a cache memory and a plurality of DASD units, comprising:
means for storing information describing said configuration of said DASD units;
means for storing a set of functional rules describing a data management function;
means for monitoring data record read/write activity in said computer system memory;
means, responsive to said configuration, monitoring and rule storing means, for dynamically evaluating allocation of all data records on said cache memory and said DASD units to detect memory performance conflicts in both said cache memory and said DASD units; and
means, responsive to said evaluating means, for identifying data records in said cache memory and DASD units that must be relocated to resolve said memory performance conflicts, comprising:
means for classifying all data records on a DASD unit that are good and bad candidates for relocation to said cache memory;
means for listing ones of said data records, classified as good candidates for relocation to said cache memory, that can be stored on one volume in said DASD unit.

16. The system of claim 15 further comprising:
means, responsive to said identifying means for transporting said identified data records to alternate memory storage locations in said cache memory and DASD units to resolve said memory performance conflicts.

17. The system of claim 15 wherein said evaluating means comprises:
means for calculating statistical data from said monitored data record read/write activity indicative of frequency of usage and locale of data records stored in said computer system memory.

18. The system of claim 17 wherein said identifying means further comprises:
means for listing ones of said DASD units that are most and least utilized; and
means, responsive to said listing means, for selecting data records from ones of said DASD units listed as most utilized and from ones of said DASD units listed as least utilized for exchange therebetween to balance activity in these listed DASD units.

19. The system of claim 18 further comprising:
means, responsive to said identifying means, for exchanging said selected data records between said listed DASD units to balance the activity on these listed DASD units.

20. The system of claim 15 further comprising:
means, responsive to said identifying means, for transporting said listed data records to said one volume in said DASD unit to resolve said memory performance conflicts.

21. A system for dynamically reorganizing the placement of data records in memory of a computer system, which includes a predefined configuration of a plurality of data storage devices, to improve the retrievability of data records stored therein, independent of said computer system wherein said computer system memory is a hierarchial memory including a cache memory and a plurality of DASD units, comprising:
means for storing information detecting said configuration of said data storage devices in said computer system memory;
means for storing a set of functional rules describing a data management function;
means responsive to said configuration and rule storing means for detecting memory performance conflicts in said computer system memory, including:
means for monitoring the data record read/write activity in said computer system memory;
means for calculating statistical data from said monitored data record read/write activity indicative of the frequency of usage and locale of the data records stored in said computer system memory;
means responsive to said detecting means for identifying data records in said computer system memory that must be relocated to resolve said memory performance conflicts, including
means for listing the ones of said DASD units that are most and least utilized;

means responsive to said listing means for selecting data records from the ones of said DASD units listed as most utilized and from the ones of said DASD units listed as least utilized for exchange therebetween to balance the activity on these listed DASD units;

means for classifying all the data records on a DASD unit that are good and bad candidates for relocation to said cache memory;

means for listing the ones of said data records, classified as good candidates for relocation to said cache memory, that can be stored on one volume in said DASD unit;

means responsive to said identifying means for exchanging said selected data records between said listed DASD units to balance the activity on these listed DASD units;

means responsive to said identifying means for automatically transporting said listed data records to said one volume in said DASD unit to resole said memory performance conflicts; and means for writing said one volume from said DASD unit into said cache memory.

22. A method of dynamically relocating data records in a computer system memory, independent of said computer system, to improve the data retrieval efficiency of said computer system memory, wherein said computer system memory is a hierarchial memory of predefined configuration including a cache memory and a plurality of DASD units, comprising the steps of:

recording information describing said configuration of said computer system memory;

storing a set of functional rules describing a computer system memory management function;

monitoring data record read/write activity of both said cache memory and said DASD units;

dynamically evaluating allocation of all data records on said cache memory and said DASD units to detect memory performance conflicts as a result of said monitoring;

identifying data records in said computer system memory that must be relocated to resolve said memory performance conflicts, comprising:

classifying all data records on a DASD unit that are good and bad candidates for relocation to said cache memory;

listing ones of said data records, classified as good candidates for relocation to said cache memory, that can be stored on one volume in said DASD unit; and automatically transporting said identified data records to alternate memory storage locations to resolve said identified memory performance conflicts.

23. The method of claim 22 wherein said step of evaluating comprises:

monitoring data record read/write activity in said computer system memory; and calculating statistical data from said monitored data record read/write activity indicative of frequency of usage and locate of data records stored in said computer system memory.

24. The method of claim 22 where said step of identifying further comprises:

listing ones of said DADS units that are most and least utilized; and selecting data records from ones of said DASD units listed as most utilized and from ones of said DASD units listed as least utilized for exchange therebetween to balance activity on these listed DASD units.

25. The method of claim 22 further comprising the step of:

transporting said listed data records to said one volume in said DASD unit to resolve said memory performance conflicts.

26. A method of improving the data retrieval efficiency of a computer system memory, wherein said computer system memory is a hierarchial memory of predetermined configuration including a cache memory and a plurality of DASD units, comprising the steps of:

recording information describing said configuration of said computer system memory;

storing a set of functional rules describing a computer system memory management function;

monitoring the operation of both said cache memory and said DASD units;

detecting memory performance conflicts as a result of said monitoring, including the steps of:

monitoring the data record read/write activity in said computer system memory;

calculating statistical data from said monitored data record read/write activity indicative of the frequency of usage and locale of the data records stored in said computer system memory;

identifying data records in said computer system memory that must be relocated to resolve said memory performance conflicts, including the steps of:

listing the ones of said DASD units that are most and least utilized;

selecting data records from the ones of said DASD units listed as most utilized and from the ones of said DASD units listed as least utilized for exchange therebetween to balance the activity on these listed DASD units;

classifying all the data records on a DASD unit that are good and bad candidates for relocation to said cache memory;

listing the ones of said data records, classified as good candidates for relocation to said cache memory, that can be stored on one volume in said DASD unit;

exchanging said selected data records between said listed DASD units to balance the activity on these listed DASD units; and transporting said listed data records to said one volume in said DASD unit to resolve said memory performance conflicts.

* * * * *